United States Patent [19]

Izumi

[11] Patent Number: 4,635,201

[45] Date of Patent: Jan. 6, 1987

[54] APPARATUS FOR DETECTING AMOUNT OF CHANGE IN ROTATIONAL SPEED OF INTERNAL COMBUSTION ENGINE

[75] Inventor: Kouichi Izumi, Higashimatsuyama, Japan

[73] Assignee: Diesel Kiki Co., Ltd., Japan

[21] Appl. No.: 619,036

[22] Filed: Jun. 11, 1984

[30] Foreign Application Priority Data

Jun. 10, 1983 [JP] Japan ................................ 58-102697
Jun. 10, 1983 [JP] Japan ................................ 58-102698

[51] Int. Cl.$^4$ ............................................. F02D 5/00
[52] U.S. Cl. ............................... 364/431.07; 123/480
[58] Field of Search ............... 364/431.07, 431.03, 364/431.04; 123/418, 419, 436, 480

[56] References Cited

U.S. PATENT DOCUMENTS

| 4,442,815 | 4/1984 | Ninomiya | 123/480 |
| 4,448,162 | 5/1984 | Ninomiya | 123/418 |
| 4,495,920 | 1/1985 | Matsumura et al. | 123/480 |
| 4,506,639 | 3/1985 | Murakami et al. | 123/418 |
| 4,532,592 | 7/1985 | Citron et al. | 364/431.07 |

Primary Examiner—Parshotam S. Lall
Attorney, Agent, or Firm—Guy W. Shoup

[57] ABSTRACT

A rotational speed change amount detecting apparatus for an internal combustion engine comprises a pulse generator for generating reference pulses representing detection of a reference rotational position of the engine, a first computer for computing the average engine speed over one combustion cycle of the engine on the basis of the time interval between the pulses, a second computer for computing, after every m pulses, the rate of speed change of the engine from the average engine speed for the most recent cycle and that for m pulses earlier, and an integrator for integrating the rate of speed change output from the second computer to obtain the amount of change in the rotational speed of the engine.

9 Claims, 8 Drawing Figures

APPARATUS FOR DETECTING AMOUNT OF CHANGE IN ROTATIONAL SPEED OF INTERNAL COMBUSTION ENGINE

BACKGROUND OF THE INVENTION

1. Field of the Invention

This invention relates to a rotational speed change amount detecting apparatus for an internal combustion engine, and more particularly to a rotational speed change amount detecting apparatus capable of detecting the amount of change in the rotational speed of an internal combustion engine such as a diesel engine with high accuracy.

2. Description of the Prior Art

In general, to conduct various controls in an internal combustion engine electronically, it is necessary to detect the rotational speed of the internal combustion engine with high accuracy. For example, in an electronically controlled governor, the gain of the control system is lowered and a filter in the form of a circuit having a small phase delay or a program providing an effect similar to such a filter is provided to attain stable operation of the engine. However, such a filter in the form of a circuit or program impairs the response characteristics of the control system when the engine load changes abruptly. It is therefore desired to detect changes in the load continuously and change the constant of the filter according to the detected result so as to provide a filter characteristic appropriate for the operation condition of the engine at each instant. For this reason, it has been proposed to detect the amount of change ($\Delta N/\Delta T$) in the engine speed N per unit time to determine the change in the load and to change the characteristic of the filter accordingly. However, it is necessary to detect the engine speed accurately to accomplish such control satisfactorily.

More specifically, in an internal combustion engine, induction, compression, power and exhaust strokes are effected in a predetermined cycle. Acceleration occurs only immediately after the power stroke so that the rotational speed of the engine varies periodically. For this reason, in order to be able to conduct controls on the basis of the rotational speed with high accuracy, it is required to obtain rotational speed data free from such periodic variation.

SUMMARY OF THE INVENTION

It is therefore an object of the present invention to provide a rotational speed change amount detecting apparatus for an internal combustion engine which is capable of obtaining accurate engine speed data required for carrying out desired control of the internal combustion engine operation in which the effect of the periodic variation in rotational speed in the internal combustion engine is eliminated.

It is another object of the present invention to provide a rotational speed change amount detecting apparatus for an internal combustion engine which is capable of obtaining the accurate engine speed data required for desired control of the engine operation in which the periodic variation in the rotational speed of the internal combustion engine and the effect of electrical noise contained in the output of a speed sensor are eliminated.

The apparatus of the present invention comprises means for generating a reference pulse each time the crankshaft of the internal combustion engine reaches a reference rotational position; a first computing means for computing, each time the pulse is generated, the average engine speed over one combustion cycle of the engine on the basis of the time interval between pulses; and a second computing means for computing, after every m pulses ($m = 1, 2, \ldots$), the rate of speed change of the engine from the average engine speed computed by the first computing means for the most recent cycle and the average engine speed computed by the first computing means m pulses earlier. The amount of change in the rotational speed of the internal combustion engine is computed by a third computing means which integrates the rate of speed change output from the second computing means.

With this arrangement, the average speed over each combustion cycle of the engine is first computed on the basis of the pulses representing the reference rotational position as described above, the rate of change in the engine speed is then computed from the computed averages, and then the computed rate of change is fed to an integrating filter. As a result, the periodic variation in rotation speed inherent to the internal combustion engine is effectively eliminated, whereby it is possible to obtain engine speed data with high accuracy. When the value of m is sufficiently large, the influence of noise-induced detection error can be reduced.

Alternatively, in place of the above-mentioned third means, there may be employed a control means which prevents any speed change rate value among those sequentially computed by the second computing means which causes a change in the change rate of the speed change rate value exceeding a predetermined value from being output as data representing the amount of rotation speed change.

According to this arrangement, the average speed over each combustion cycle of the engine is first computed on the basis of the pulses representing the reference rotational position, the rate of change in the engine speed is then computed from the computed averages, momentary aberrations in the change rate due to noise are detected by monitoring the change rate of the value of the change rate and any aberrations are eliminated to obtain engine speed data of high accuracy and high reliability which is free from the influence of the periodic variation in rotation speed inherent to the internal combustion engine. When the value of m is selected to be large, the influence of detection error due to noise can be reduced.

BRIEF DESCRIPTION OF THE DRAWINGS

FIG. 1 is a schematic block diagram of one example of an electronically controlled governor to which the rotation speed change amount detecting apparatus of the present invention is applied. The electronically controlled governor 1 controls the position of a control rack 4 which is a fuel adjusting member for a fuel injection pump 3 connected to a diesel engine 2 for controlling the amount of fuel supplied to the diesel engine 2 so that the speed of the diesel engine 2 can be controlled according to a predetermined governor characteristic. The electronically controlled governor 1 comprises a microcomputer 5 which computes the target position to which the control rack 4 should be controlled. The microcomputer 5 has a predetermined computing program stored therein and receives as input acceleration data $D_1$ output by an acceleration pedal sensor 7 and representing the amount of depression of an accelerator pedal 6, coolant temperature data $D_2$ output by a coolant temperature sensor 8 and representing the engine coolant temperature, and reference pulses P output by a pulse generator 10. The diesel engine 2 includes a speed sensor 9 comprising a gear 9a fixed to the crankshaft 2a of the diesel engine 2 and an electromagnetic pickup coil 9b so arranged that the cogs of the gear 9a approach and depart from the electromagnetic pickup coil 9b in sequence. The positional relationship between the electromagnetic pickup coil 9b and the gear 9a is so determined that a pulse voltage is induced in the electromagnetic pickup coil 9b each time a predetermined piston (not illustrated) of the diesel engine 2 reaches upper dead center. The voltages induced in the electromagnetic pickup coil 9b are input to the pulse generator 10 and a train of pulses P representing the top dead center timing of the predetermined piston is output and fed into the microcomputer 5.

Figure 1:
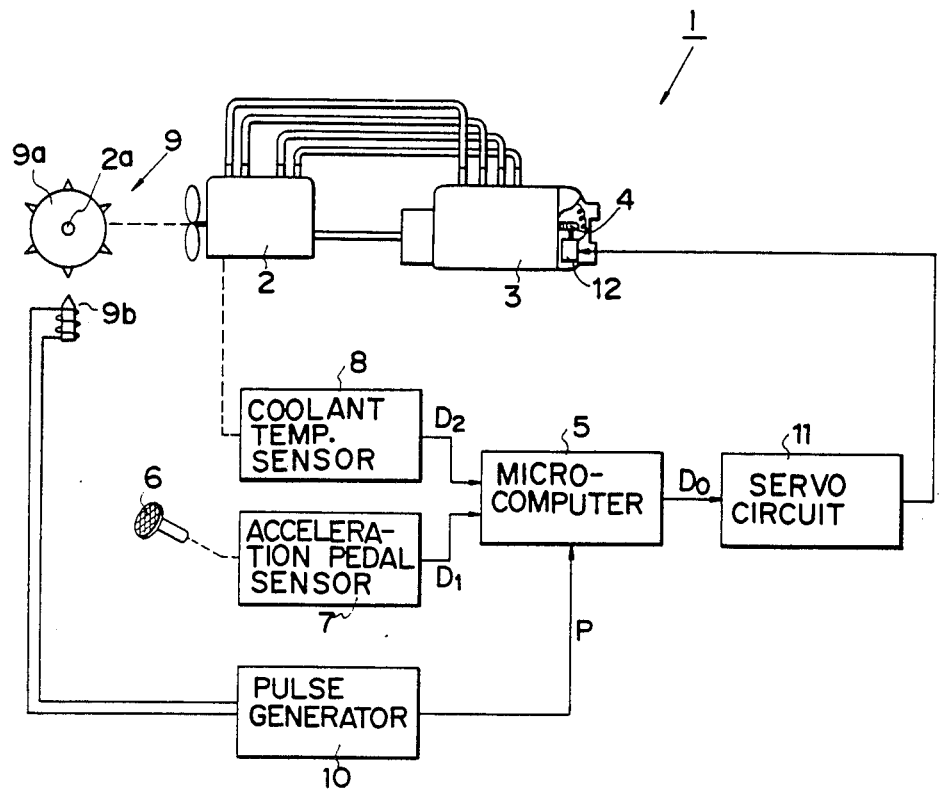
FIG. 1 is a schematic block diagram of an embodiment of an electronically controlled governor to which the present invention is applied.
Figure 2A:
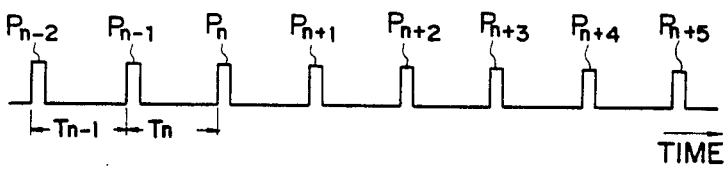
FIG. 2A is the waveform of a reference pulse from a pulse generator shown in FIG. 1.
Figure 2B:
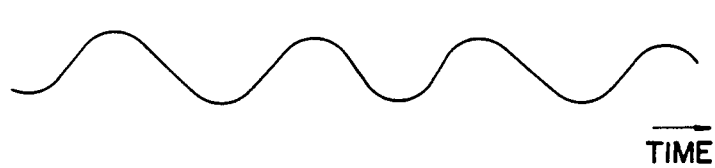
FIG. 2B shows the instantaneous variation in the speed of the engine shown in FIG. 1.

In the embodiment as illustrated, the diesel engine 2 is of the 4-stroke 6-cylinder type and therefore six pulses are output from the pulse generator 10 and combustion is effected three times during one rotation of the engine. Therefore, when the timing pulses $P_{n-1}$, $P_n$, $P_{n+1}$, ... are obtained as shown in FIG. 2A, the instantaneous rotation speed N of the engine changes in cycles having a period which is twice as long as the period between the pulses P, as shown in FIG. 2B. This periodic change in the rotation speed N appears as a positional change on the time axis of the pulses P.

The pulses P are input to the microcomputer 5, and the rotation speed at each instant is computed from the time interval between the pulses P and the computation for positioning the control rack 4 is implemented based on the computed rotation speed data, the acceleration data $D_1$ and the coolant temperature data $D_2$. The so obtained position control data $D_0$ representing the control position of the control rack 4 is input to a servo circuit 11 which then drives an actuator 12 connected to the control rack 4 so as to move the control rack 4 to the position indicated by the position control data $D_0$.

Figure 3:
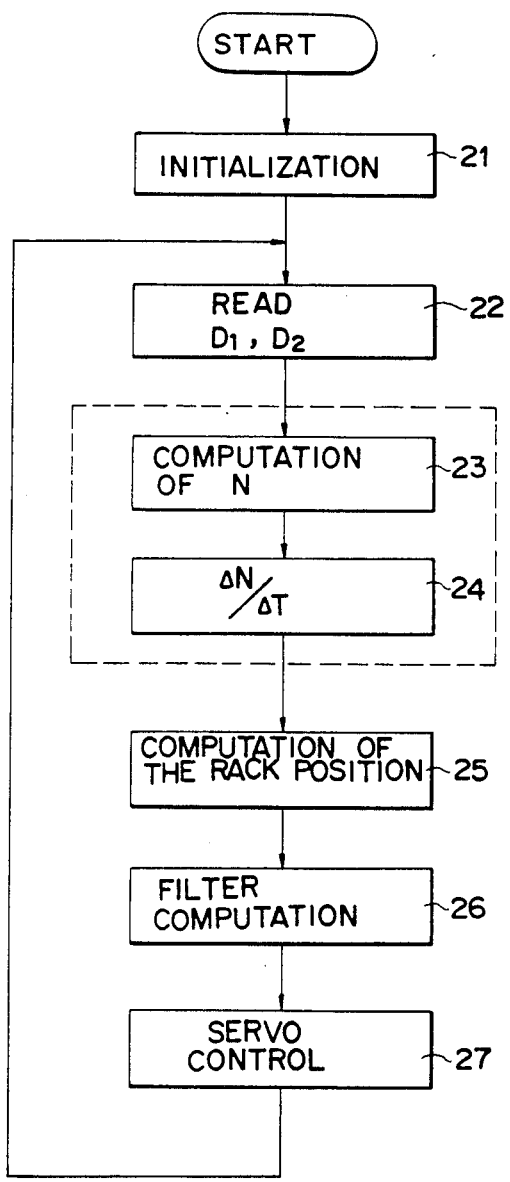
FIG. 3 is a flow chart representing a control program stored in the microcomputer shown in FIG. 1.

FIG. 3 shows a flowchart of the steps carried out by the microcomputer 5 in computing the target position of the control rack 4. At the outset, initialization is effected at step 21 and the data $D_1$ and $D_2$ input to the microcomputer 5 are then read in (step 22). Thereafter, the rotation speed N is computed from the pulses P at step 23 and the amount of change in the engine speed N per unit time is computed as an amount representing the change in the load at step 24. Then, the desired position of the control rack 4 for the condition of the engine operation at that instant is computed at step 25 on the basis of the input data $D_1$ and $D_2$ and the data concerning the rotational speed N computed at step 23.

The computation of the target position of the control rack 4 is carried out in conformity with a predetermined governing chart and may be made by in advance storing a plurality of data representing positions of the control rack 4 in a read only memory (ROM; not shown) of the microcomputer 5 and then applying the data $D_1$ and $D_2$ and the rotational speed data to the ROM as address signals so as to read out the rack position appropriate for the engine operating condition at that instant.

Figure 4:
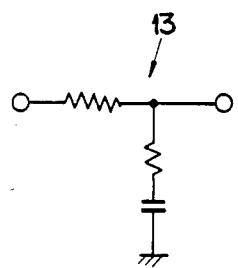
FIG. 4 is a circuit diagram of an integrating circuit.

The rack position data obtained by the computation at step 25 is then subjected to a filter computing step 26 which achieves through a programmed processing operation substantially the same correction governor characteristic as would be obtained by a correcting filter 13 as illustrated in FIG. 4. At step 26, a filter computation (as will be described later) is carried out on the basis of the amount of change in the engine speed N computed at step 24 so as to effect the required characteristic correction. The resultant data is processed at step 27 and the position control data $D_0$ is output as a servo control signal. The computations of step 21 to step 27 are repeatedly executed at predetermined intervals. This program may be arranged so that one cycle thereof is executed in the interval between each successive pair of pulses P.

The computations at steps 23 and 24 in the flowchart of FIG. 3 will now be described with reference to FIG. 5. At first, the time intervals $T_{n-1}$, $T_n$, $T_{n+1}$, $T_{n+2}$, ... between successive pairs of pulses are computed in step 30 and as many such time interval data as are required for the computations to be carried out in the subsequent steps are stored in the memory of the microcomputer 5.

Next, the rotational speed $N_n$ of the engine in the n-th program cycle is computed by the following equation:

$$N_n = \frac{2}{T_{n-1} + T_n} \qquad (1)$$

More specifically, the sum of the time interval $T_n$ between the pulse $P_n$ and the preceding pulse $P_{n-1}$ and the time interval $T_{n-1}$ between the pulse $P_{n-1}$ and the preceding pulse $P_{n-2}$ is computed and the reciprocal of this sum is multiplied by 2 to determine the speed $N_n$ at that time (refer to FIG. 2). In other words, the rotational speed of the engine is computed from the time required for one engine combustion cycle. As a result, the periodic variation component of the engine rotation due to the power stroke can be averaged out in the computation more effectively than in the case where the rotational speed is computed from the time interval between adjacent pulses. When the computation of the rotational speed has been completed at step 31, 1 is added to the count of a counter CTR which is established by the program at step 32. Since the CRT is set at zero at the initial stage, the count stored therein represents the number of rotational speed computations that have been made. At the following step 33, determination is made as to whether the count in the CTR has reached a predetermined value m. When CTR<m, the program proceeds to step 36 to repeat the above-mentioned steps without carrying out steps 34 and 35.

When the computation of the rotational speed has been carried out m times, step 34 is carried out after step 33 and the count of the CTR is made zero. Thereafter, at step 35, the speed change rate $\Delta N/\Delta T$ of the engine is calculated by the following equation:

$$\Delta N/\Delta T = \frac{k}{m}(N_m - N_0)N_m \qquad (2)$$

where $N_0$ represents the rotational speed value obtained by the rotational speed computation when CTR=0, $N_m$ is the rotational speed value when CTR=m and k is a constant. The amount of change in the rotational speed per unit time is computed every m pulse intervals so that even if an abnormal noise value should be introduced, it will be averaged out so that a more accurate computed result can be obtained. The degree of averaging is determined by the magnitude of the value of m. In this connection, it is to be noted that m may be 1. In this case, step 35 is always implemented after steps 30 and 31.

After completion of step 35, or when the result of the determination at step 33 is NO, the program proceeds to step 36 where computation is carried out on the basis of the value $\Delta N/\Delta T$ for that time and the integration value $\Delta N/\Delta T'$ of the speed change rate obtained in the previous program cycle, according to the following formula:

$$\Delta N/\Delta T_{DATA} = \Delta N/\Delta T + k'(\Delta N/\Delta T - \Delta N/\Delta T') \qquad (3)$$

The computed result is temporarily stored in a memory as $\Delta N/\Delta T_{DATA}$. In this case, k' is a constant and the computed result is an integration value of the speed change rate of the engine. Thus, the integration value $\Delta N/\Delta T'$ of the preceding speed change rate is used to obtain the integration value data $\Delta N/\Delta T_{DATA}$ for the latest change rate of the engine speed. The so obtained integration value data $\Delta N/\Delta T_{DATA}$ is stored, at step 37, as the latest integration value data, replacing the above-mentioned $\Delta N/\Delta T'$, and is output as data representing the amount of change in the engine speed.

As can be understood from the foregoing description, the computation by the equation (2) achieves substantially the same effect as would be obtained by passing the computed speed change rate through an integration filter and, moreover assures that the effect of noise can be eliminated with greater certainty.

Figure 6:
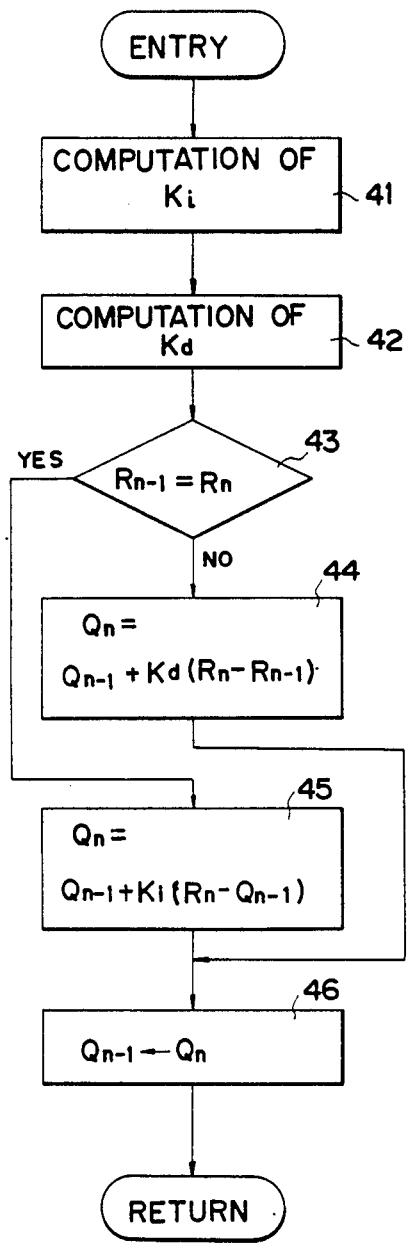
FIG. 6 is a detailed flow chart of a step shown in FIG. 3.

FIG. 6 is a flowchart for carrying out a filter computation at step 26. At steps 41 and 42, an integration constant $K_i$ and differential coefficient $K_d$ are computed based on the value $\Delta N/\Delta T$. $K_i$ and $K_d$ are values for setting conditions corresponding to the integral action and differential action of the filter circuit as shown in FIG. 4, respectively, and are determined according to the magnitude of $\Delta N/\Delta T$. When $K_i$ and $K_d$ are so determined, the rack position data $R_n$ most recently computed at step 25 and the rack position data $R_{n-1}$ computed one cycle before are compared at step 43. When $R_n = R_{n-1}$, computation is carried out at step 45 according to the following formula:

$$Q_n = Q_{n-1} + K_i(R_n - Q_{n-1}) \qquad (4)$$

where $Q_{n-1}$ is data based on the result of the computation carried out one cycle before and $Q_n$ represents the corrected injection control amount of the present cycle. The data obtained as a result of the computation of $Q_{n-1} + K_i(R_n - Q_{n-1})$ is stored as $Q_n$.

On the other hand, when $R_n \neq R_{n-1}$, computation $$Q_n = Q_{n-1} + K_d(R_n - R_{n-1}) \qquad (5)$$

is carried out at step 44 and the computed result is stored as $Q_n$.

When computation of $Q_n$ is thus completed, the data $Q_n$ is stored as $Q_{n-1}$ (step 46) for computation in the succeeding cycle and the filter computation is completed.

Figure 5:
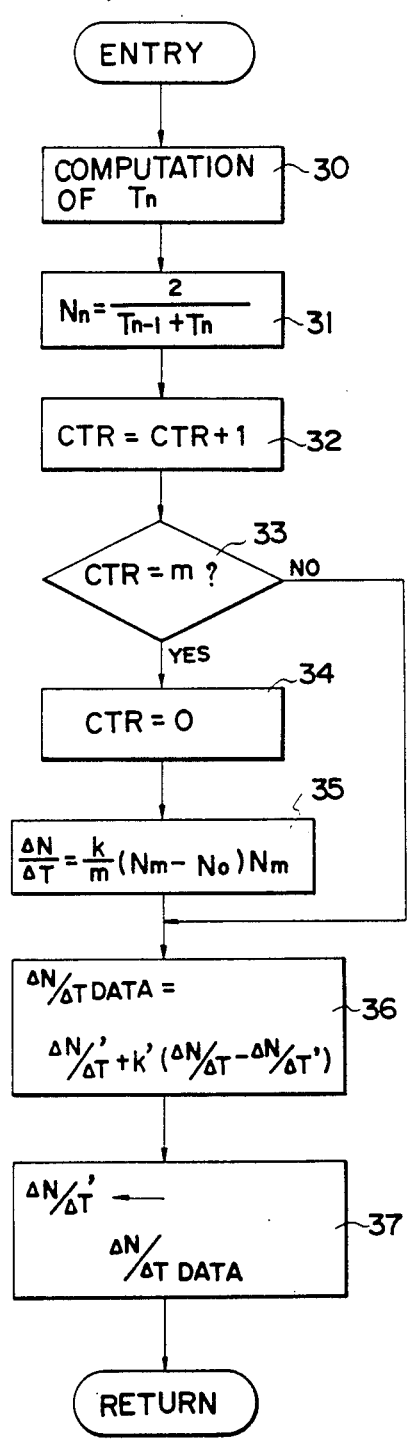
FIG. 5 is a detailed flow chart of steps shown in FIG. 3.

In the above-mentioned example, the computation of $\Delta N/\Delta T'$ is conducted by a program, but, alternatively, the processing of FIG. 5 may be conducted by circuit components.

With the arrangement as described above, the average speed of the engine is first computed from pulses indicating a predetermined reference timing such as the top dead center timing and the integration value of the amount of change in the engine speed is obtained from the computed average speed, so that the effect of the periodic variation in rotational speed, which is inherent to the internal combustion engine, can be eliminated and the effect of noise pulses can also be effectively eliminated to provide accurate and reliable engine speed data.

Figure 7:
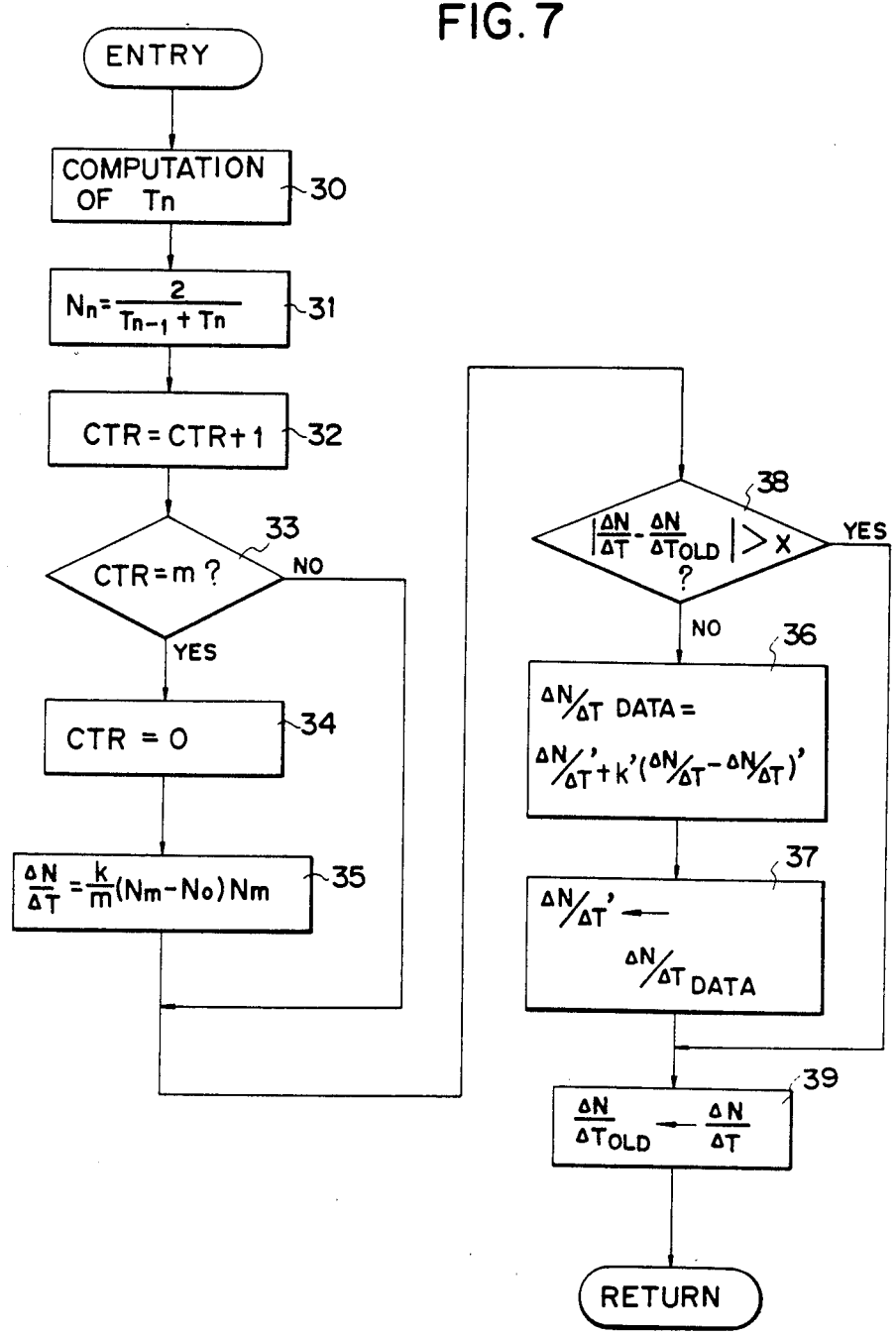
FIG. 7 is another detailed flow chart of steps shown in FIG. 3.

FIG. 7 is a flowchart of another program for carrying out the computation at steps 23 and 24 as shown in FIG. 3. In FIG. 7, steps which are the same or similar to those shown in FIG. 5 are designated by the same or similar numerals and the description thereof is omitted.

In the program as shown in FIG. 7, after completion of step 35 or when the result of step 33 is NO, the program proceeds to step 38. In step 38 it is determined whether or not the change rate of the values of the speed change rates $\Delta N/\Delta T$ sequentially obtained at step 35 is larger than a predetermined value X or not. At step 38, the absolute value of the difference between the latest speed change rate $\Delta N/\Delta T$ and the preceding speed change rate $\Delta N/\Delta T_{OLD}$ is computed and this difference is compared with the value X, as follows:

$$\left| \frac{\Delta N}{\Delta T} - \frac{\Delta N}{\Delta T_{OLD}} \right| > X \qquad (6)$$

Therefore, the value of X may be set to be an appropriate value larger than the maximum value of the change rate of the value of $\Delta N/\Delta T$ in ordinary operation of the engine. In this way, it will be possible to detect and eliminate any abnormal values of the speed change rate $\Delta N/\Delta T$ due to, for example, electrical noise.

When the result of the determination at step 38 is YES, i.e., when the calculated value as shown by the formula (6) is larger than the value of X, the program proceeds to step 39 and the value $\Delta N/\Delta T$ now obtained is stored as $\Delta N/\Delta T_{OLD}$. In this case, the value $\Delta N/\Delta T$ is not output.

When the result of the determination at step 38 is NO, i.e., when the calculated value as indicated by the formula (6) is below the value of X, the value of $\Delta N/\Delta T$ is determined as normal and the following data processing steps 36 and 37 are carried out. The so obtained integration value data $\Delta N/\Delta T_{DATA}$ is stored as new integration value data replacing the above-mentioned $\Delta N/\Delta T'$ and is output as data representing the amount of change in the engine speed. Thereafter, the processing of step 39 is carried out so that the value $\Delta N/\Delta T$ obtained at that time can be used as $\Delta N/\Delta T_{OLD}$ in the succeeding program cycle. Thus, in the succeeding program cycle, the value of $\Delta N/\Delta T$ previously obtained is used as $\Delta N/\Delta T_{OLD}$.

As can be understood from the foregoing description, the computation and comparison according to the formula (6) achieves an effect substantially the same as that which would be obtained by taking out only the normal value through an integration filter. Therefore, the effect of noise can be eliminated with greater certainty to assure accurate and reliable speed change amount detection.

According to the above-mentioned arrangement, the average speed of the engine at each instant is first computed from pulses representing a predetermined reference timing such as top dead center timing, the rate of change in the engine speed is computed from sequentially computed average speeds and any so-computed rate of change exhibiting an abnormal value is detected and eliminated so as to allow only normal change rate values to be output as a speed change amount data. Thus, the effect of the periodic variation in rotational speed inherent to the internal combustion engine can be eliminated and the effect of noise pulses can also be effectively eliminated to provide engine speed data of high accuracy and high reliability.

What is claimed:

1. An apparatus for detecting the amount of change in the rotational speed of an internal combustion engine, comprising:
   means for generating a reference pulse each time the crankshaft of the internal combustion engine reaches a reference rotational position;
   a first computing means for computing the average engine speed over one combustion cycle of the internal combustion engine on the basis of the time intervals between the reference pulses;
   a second computing means for computing the rate of speed change of the internal combustion engine after every m reference pulses (m=1, 2, ... ) from the average engine speed ($N_0$) computed by said first computing means at that time and the average engine speed ($N_m$) computed m pulses earlier; and
   a third computing means for computing an updated integration value of the speed change rate obtained by said second computing means to obtain the amount of change in the rotational speed of the internal combustion engine.

2. The apparatus as claimed in claim 1 wherein said first computing means has means for computing the time interval between each reference pulse and the preceding reference pulse in response to the occurrence of each reference pulse and means for computing the average engine speed over one combustion cycle on the basis of the time intervals between the reference pulses.

3. The apparatus as claimed in claim 2 wherein R reference pulses are generated per combustion cycle and the average engine speed is computed on the basis of the R time intervals during each combustion cycle.

4. The apparatus as claimed in claim 1 wherein the speed change rate $\Delta N/\Delta T$ of the internal combustion engine is computed by the following formula:

$$\Delta N/\Delta T = \frac{k}{m}(N_m - N_0)N_m$$

wherein, k is a constant.

5. The apparatus as claimed in claim 1 wherein said third computing means computes the integration value of the speed change rate of the internal combustion engine from the present speed change rate computed by said second computing means and the integration value of the speed change rate computed by said second computing means a predetermined time earlier.

6. The apparatus as claimed in claim 5 wherein the integration value of the speed change rate of the internal combustion engine is computed in accordance with the following formula:

$$R_2 + k'(R_1 - R_2)$$

where,
   $R_1$ is the present speed change rate;
   $R_2$ is the integration value of the earlier speed;
   $k'$ is a constant.

7. An apparatus for detecting the amount of change in the rotational speed of an internal combustion engine, comprising:
   means for generating a reference pulse each time the crankshaft of the internal combustion engine reaches a reference rotational position;
   a first computing means for computing the average engine speed over one combustion cycle of the internal combustion engine on the basis of the time interval between the reference pulses;
   a second computing means for computing the rate of speed change of the internal combustion engine after every m pulses (m=1, 2, ... ) from the average engine speed ($N_0$) computed by said first computing means at that time and the average engine speed ($N_m$) computed m pulses earlier; and
   a control means which prevents from being output as data showing the amount of change in rotational speed of the internal combustion engine any speed change rate computed by said second computing means which causes a change of greater than a predetermined magnitude in the change rate of the speed change rate.

8. The apparatus as claimed in claim 7 wherein said control means has means for discriminating whether or not the difference between the present speed change rate computed by said second computing means and a speed change rate computed by said second computing means a predetermined time earlier is more than a predetermined value and means responsive to the result of the discriminating means for outputting the present speed change rate as data indicating the amount of change in the rotational speed of the internal combustion engine when the difference is not more than the predetermined value and outputting the earlier speed change rate as the data when the difference is more than the predetermined value.

9. The apparatus as claimed in claim 8, further comprising means for computing the integration value of the speed change rate of the internal combustion engine obtained from said control means.

* * * * *